Patented Aug. 18, 1936

2,051,300

UNITED STATES PATENT OFFICE 2,051,300

PROCESS FOR THE MANUFACTURE OF ALKYL PHENOLS

Ralph C. Huston, East Lansing, Mich., assignor to Michigan State Board of Agriculture, East Lansing, Mich., a corporation of Michigan No Drawing. Application July 21, 1934, Serial No. 736,373

4 Claims. (Cl. 260—154)

This invention relates to the process of manufacturing alkyl phenols by condensing a phenol and an aliphatic alcohol in the presence of an inert solvent by the use of anhydrous aluminum chloride.

Heretofore alkyl phenols have been produced by reducing acyl phenols in the presence of various catalysts and by condensing alkyl halides, alkenes or alkyl hydroxides with phenols under the catalytic influence of various catalysts.

The present invention provides a new process for the preparation of alkyl phenols. A mono or dihydric phenol, or its homologue, and a secondary or tertiary aliphatic alcohol are condensed in an inert solvent such as petroleum ether, carbon disulfide or nitro benzene by the use of anhydrous aluminum chloride. Preferably two parts of alcohol are used with from one to ten parts of phenol. The condensation is preferably effected at temperatures between 0° C. and 50° C. Best results are obtained by the use of any of the tertiary alcohols although satisfactory results are obtained when secondary alcohols are used.

Tertiary butyl phenol may be prepared in accordance with the present process as follows:

A mixture of equal portions of phenol and tertiary butyl alcohol are suspended in a suitable inert solvent such as petroleum ether and constantly stirred while anhydrous aluminum chloride is added at a rate which maintains the temperature of the mixture at about 30° C. Sufficient anhydrous aluminum chloride is added to effect complete condensation of the phenol and alcohol. After condensation has been completed the mixture is allowed to stand a short time and is then decomposed with cold water and the butyl phenol recovered either by fractional distillation of the petroleum ether or by direct crystallization.

The chemical reaction which occurs during the preparation of butyl phenol as just described is as follows:

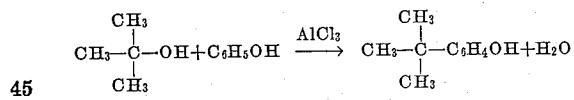

It is an advantage of the present process that it can be practiced at normal temperatures and pressures, namely, from 0° to 50° C. and at atmospheric pressure. It is especially adapted for the commercial production of alkyl phenols.

I claim:

1. A process for the manufacture of tertiary alkyl phenols, which comprises reacting a phenol and a monohydric tertiary aliphatic alcohol in the presence of a sufficient quantity of anhydrous aluminum chloride to produce a condensation between said phenol and said alcohol, the temperature of the reaction mixture being of the order of 50° C. or less.

2. A process for the manufacture of tertiary alkyl phenols, which comprises suspending a phenol and a monohydric tertiary aliphatic alcohol in a relatively low-boiling organic liquid which is inert to the reaction involved, adding a sufficient quantity of anhydrous aluminum chloride to the inert liquid to produce a condensation reaction between said phenol and said alcohol, the temperature of the reaction mixture being below substantially 50° C. during the reaction, decomposing the resulting mixture by the addition of cold water, and subjecting the mixture to a physical treatment for separation of the condensation product.

3. A process for the manufacture of tertiary alkyl phenols, which comprises dissolving a phenol and a monohydric tertiary aliphatic alcohol in an organic solvent which is inert to the reaction involved, adding a sufficient quantity of anhydrous aluminum chloride to said inert solvent to produce a condensation reaction between said phenol and said alcohol, the temperature of the reaction mixture being below substantially 50° C. during the reaction, and crystallizing the reaction product.

4. A process for the manufacture of tertiary butyl phenol, which comprises suspending phenol and tertiary butyl alcohol in an inorganic liquid inert to the reaction involved, adding a sufficient quantity of anhydrous aluminum chloride to said liquid to produce a condensation reaction between said phenol and said alcohol, the temperature of the reaction mixture being between substantially 0° C. and 50° C., and subjecting the reaction mixture to a physical step for separation of the condensation product.

RALPH C. HUSTON.